US008876067B2

(12) United States Patent
McAllister et al.

(10) Patent No.: US 8,876,067 B2
(45) Date of Patent: Nov. 4, 2014

(54) BRACKET

(75) Inventors: Christopher McAllister, Nevis, MN (US); Eric Skare, Farmington, MN (US); John Liebelt, Farmington, MN (US); Chris Sellner, Lakeville, MN (US); Timothy Cota, Lakeville, MN (US)

(73) Assignee: Uponor Innovation AB, Virsbo (SE)

( * ) Notice: Subject to any disclaimer, the term of this patent is extended or adjusted under 35 U.S.C. 154(b) by 183 days.

(21) Appl. No.: 13/318,405

(22) PCT Filed: May 8, 2009

(86) PCT No.: PCT/US2009/043338
§ 371 (c)(1),
(2), (4) Date: Nov. 18, 2011

(87) PCT Pub. No.: WO2010/128971
PCT Pub. Date: Nov. 11, 2010

(65) Prior Publication Data
US 2012/0061106 A1    Mar. 15, 2012

(51) Int. Cl.
*F16L 3/08* (2006.01)
*F16L 41/12* (2006.01)
*A62C 35/68* (2006.01)

(52) U.S. Cl.
CPC ............... *F16L 3/085* (2013.01); *F16L 41/12* (2013.01); *A62C 35/68* (2013.01)
USPC ............................ 248/65; 248/74.1; 239/283

(58) Field of Classification Search
USPC .............. 248/75, 65, 300, 74.4; 239/283, 282
See application file for complete search history.

(56) References Cited

U.S. PATENT DOCUMENTS

| | | | | |
|---|---|---|---|---|
| 1,070,921 A | * | 8/1913 | Saltiel | 52/686 |
| 2,616,647 A | * | 11/1952 | Murchison | 248/110 |
| D224,085 S | * | 7/1972 | Cuva | D8/363 |
| 3,788,025 A | * | 1/1974 | Holmes | 52/685 |
| D265,508 S | * | 7/1982 | Rusteberg | D24/128 |
| D276,212 S | * | 11/1984 | Villanueva | D8/373 |
| 4,834,186 A | | 5/1989 | Ballard | |
| D323,614 S | * | 2/1992 | Bell | D8/373 |
| D337,851 S | * | 7/1993 | Gary | D26/138 |
| D369,957 S | * | 5/1996 | Blanton | D8/373 |
| D375,453 S | * | 11/1996 | Fleck | D8/395 |
| 6,158,519 A | | 12/2000 | Kretschmer | |
| 6,648,281 B1 | * | 11/2003 | Lake | 248/75 |
| D490,690 S | * | 6/2004 | Brass et al. | D8/354 |
| 6,755,379 B2 | | 6/2004 | Kirschner | |

(Continued)

FOREIGN PATENT DOCUMENTS

| | | |
|---|---|---|
| JP | 11-151319 | 6/1999 |
| JP | 2002-239024 | 8/2002 |
| JP | 2008-011869 | 1/2008 |
| WO | 2007/022578 | 3/2007 |

*Primary Examiner* — Terrell McKinnon
*Assistant Examiner* — Daniel Breslin
(74) *Attorney, Agent, or Firm* — Occhiuti & Rohlicek LLP (57) ABSTRACT

A fire sprinkler fitting support bracket (100) is disclosed for mounting fire sprinkler tee-fitting (30) to a building structural component (5). The bracket (100) includes a mounting portion (103), and a cradle portion (101) cantilevered from the mounting portion (103). The cradle portion (101) is configured to receive and support the fitting body (32) on a concave surface (190*a*, 190*b*) thereof. The fitting (30), which may be a tee fitting, elbow fitting, or the like, is detachable from the bracket (100).

9 Claims, 9 Drawing Sheets

(56) References Cited

U.S. PATENT DOCUMENTS

| | | | |
|---|---|---|---|
| D494,849 S * | 8/2004 | Gary et al. | D8/395 |
| 6,783,102 B2 | 8/2004 | Kirschner | |
| D506,385 S * | 6/2005 | Brown | D8/396 |
| 6,969,462 B2 | 11/2005 | Liang | |
| D513,168 S * | 12/2005 | Chu | D8/356 |
| 7,017,868 B2 | 3/2006 | Kirschner | |
| D538,634 S * | 3/2007 | King | D8/380 |
| 7,195,218 B2 * | 3/2007 | James et al. | 248/251 |
| D562,675 S * | 2/2008 | Cox et al. | D8/395 |
| 7,455,268 B2 * | 11/2008 | Heath | 248/74.1 |
| 7,455,278 B2 * | 11/2008 | Hsu | 248/675 |
| 7,469,515 B2 * | 12/2008 | Minor | 52/719 |
| D597,402 S * | 8/2009 | Garza | D8/380 |
| 7,568,305 B2 * | 8/2009 | Fanfelle | 43/3 |
| 7,900,419 B2 * | 3/2011 | Kodi | 52/745.21 |
| 7,963,392 B2 * | 6/2011 | Kodi | 206/340 |
| 8,382,046 B2 * | 2/2013 | Holland et al. | 248/73 |
| 2008/0191108 A1* | 8/2008 | Hsu | 248/207 |
| 2008/0237407 A1 | 10/2008 | Kim | |
| 2008/0277124 A1 | 11/2008 | Johnston et al. | |

* cited by examiner

BRACKET

CROSS REFERENCE TO RELATED APPLICATIONS

This application claims priority to International Application No. PCT/US2009/043338, file May 8, 2009, the contents of which are incorporated herein in their entirety.

BACKGROUND OF THE INVENTION

1. Field of the Invention

The invention relates to a fire sprinkler fitting support bracket.

2. Description of the Background Art

Figure 1:
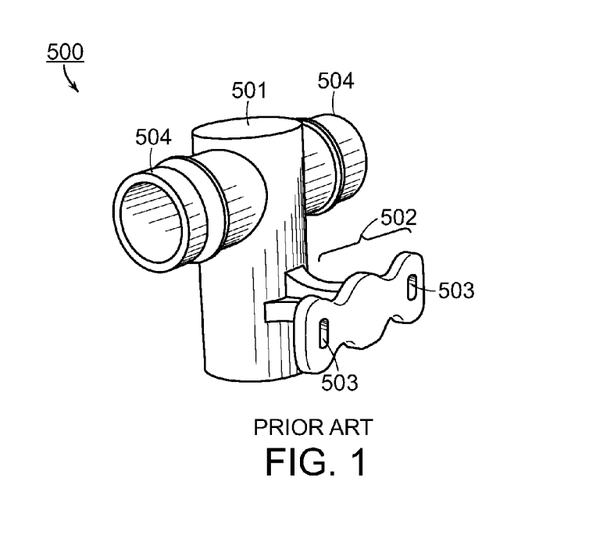
FIG. 1 is a perspective view of a prior art fire sprinkler fitting.
Figure 2:
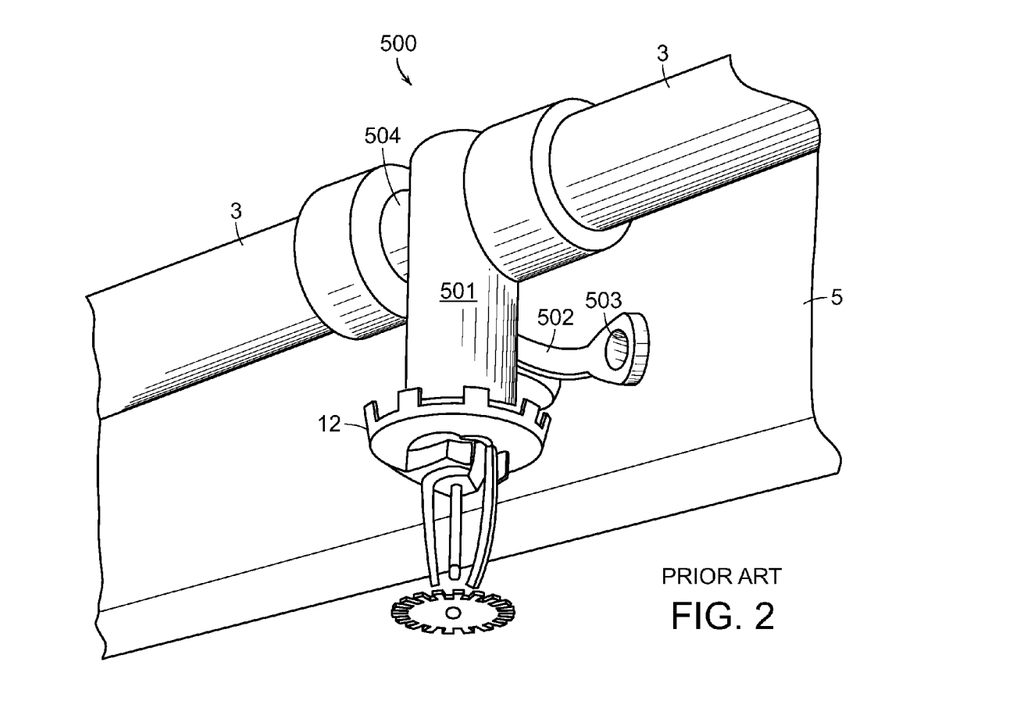
FIG. 2 is a perspective view of the prior art fire sprinkler fitting of FIG. 1 mounted to a ceiling joist and connected to a water supply line and sprinkler head.

It is well known to provide fire protection sprinkler systems in commercial and residential building structures. Such systems are generally installed in the space above a ceiling, and include fire sprinkler heads which extend downward through the ceiling. In some fire protection systems, the fire protection sprinklers are supplied by a dedicated water supply line that is separate from the water supply line that supplies the other fixtures (sink, toilet, etc.) of the building. In such systems, the supply line is formed of rigid pipe which terminates at a fire sprinkler head fitting. The rigid pipe is secured to the building structure using brackets positioned periodically along the length of the pipe as well as near the fire sprinkler fitting. In other fire protection systems, water is supplied in a looped system, in which the main trunk water supply line circulates in the ceiling of the building, and is used to supply both the fire protection sprinklers and the other building fixtures. In the looped system, the supply line is often formed of a flexible pipe, and tee fittings are periodically incorporated along the length of the supply line to permit connection of a sprinkler head thereto. Referring to FIGS. 1 and 2, such conventional tee fittings 500 are typically made of a metal such as stainless steel, and include a T-shaped body portion 501 formed integrally with a bracket portion 502. The body portion 501 includes connectors 504 for connecting to input and output water supply lines 3, and is also connectable to the sprinkler head 12. The bracket portion 502 may include through holes 503 that permit the tee fitting 500 to be secured to a building structural component 5 such as a ceiling joist.

SUMMARY

A fire sprinkler fitting support bracket is disclosed for mounting fire sprinkler fitting to a building structural component. The bracket includes a mounting portion, and a cradle portion cantilevered from the mounting portion. The cradle portion is configured to receive and support the fitting body on a concave surface thereof. The fitting, which may be a tee fitting, elbow fitting, or the like, is detachable from the bracket.

In some aspects, a fire sprinkler fitting support bracket is provided. The bracket includes a leg plate, a foot plate and a pair of cradle plates. The leg plate includes a base edge; a free edge opposed to the base edge; and opposed first and second side edges extending between the base edge and the free edge. The foot plate includes a fold edge that is fixed to the base edge so that a first surface of the leg plate and a first surface of the foot plate define an angle therebetween. A pair of cradle plates extend from a second surface of the leg plate, the second surface being opposed to the first surface. One of the pair of cradle plates extends along each of the first and second side edges of the leg plate. The leg plate is formed having a concave cut-out that opens along the free edge, and each cradle plate is formed having a concave cut out that opens along an edge thereof that is opposed to the second surface of the leg plate.

The bracket may include one or more of the following features: The foot plate has a trapezoidal peripheral shape. The foot plate includes a free edge opposed to the fold edge, the free and fold edges of the foot plate are parallel, and the free edge of the footplate is longer than the fold edge of the footplate. The foot plate includes a first pair of through holes, each hole of the first pair of through holes located a first distance from the free edge. The foot plate includes a second pair of through holes, each hole of the second pair of through holes located a second distance from the free edge, and the second distance is greater than the first distance. The leg plate, the foot plate, and the pair of cradle plates are formed of a single plate member that includes a first bend portion disposed at a location corresponding to the base edge, the first bend joining the leg plate to the foot plate, a second bend portion disposed at a location corresponding to the first side edge of the of the leg plate, the second bend joining a first one of the pair of cradle plates to the leg plate, and a third bend portion disposed at a location corresponding to the second side edge of the leg plate, the third bend joining a second one of the pair of cradle plates to the leg plate. The first, second and third bend portions are of approximately 90 degrees, and the bend direction of the first bend portion is opposed to that of the second and third bend portions. The first bend portion includes a gusset. The leg plate cut-out includes a substantially semi-circular portion having a center, each cradle plate cut-out includes a substantially semi-circular portion having a respective center, and the distance of the center of the leg plate cut-out from the first surface of the foot plate, and the distance of the center of each of the cradle plate cut-outs from the first surface of the foot plate, are the same.

In some aspects, a fire protection sprinkler assembly is provided for use in a fire protection system within a building. The assembly includes a fire protection sprinkler head; a tee-fitting configured to connect the sprinkler head to a water supply line of the system; and a bracket as described above for mounting the tee-fitting to a structural component of the building, the fitting disposed in and supported by the cradle portion of the bracket.

In some aspects, a fire sprinkler fitting is provided. The fitting includes a hollow fitting body. The body includes a first arm aligned along a first axis and defining first passage and a second arm defining a second passage. The first and second passages are in fluid communication with each other, and the second arm is aligned along a second axis perpendicular to the first axis. The fitting further includes a bracket which permits mounting of the fitting body to a building structure. The bracket includes a mounting portion, and a cradle portion cantilevered from the mounting portion. The cradle portion is configured to receive and support the fitting body. The fitting body is detachable from the bracket.

The fire sprinkler fitting may include one or more of the following features: The cradle portion includes a leg plate having a base edge; a free edge opposed to the base edge; and opposed first and second side edges extending between the base edge and the free edge. The mounting portion includes a foot plate having a fold edge that is fixed to the base edge of the leg plate so that a first surface of the leg plate and a first surface of the foot plate define an angle therebetween. The cradle portion further includes a pair of cradle plates extending from a second surface of the leg plate, the second surface being opposed to the first surface, one of the pair of cradle plates extending along each of the first and second side edges of the leg plate. The leg plate is formed having a concave cut-out that opens along the free edge, and each cradle plate is formed having a concave cut out that opens along an edge thereof that is opposed to the second surface of the leg plate.

The fire sprinkler fitting may further include one or more of the following features: The leg plate cut-out and the cradle plate cut-outs are each sized and shaped to receive one of the first and second arms. The cradle portion is cantilevered from the fold edge of the foot plate. The leg plate cut-out and the cradle plate cut-outs are sized and shaped to receive one of the first and second arms, and the fitting body is disposed on the leg plate such that the first arm is disposed in one of the cradle plate cut-outs, and the second arm extends through the leg plate cut out. The leg plate cut-out includes a generally semi-circular portion having a center, each cradle plate cut-out includes a generally semi-circular portion having a respective center, and the distance of the center of the leg plate cut-out from the first surface of the foot plate, and the distance of the centers of each of the cradle plate cut-outs from the first surface of the foot plate, are the same. An interior surface of the second passage comprises threads configured to cooperatively engage corresponding threads formed on an outer surface of a fire sprinkler head.

The fire sprinkler fitting may further include one or more of the following features: The fitting body is formed having a T-shape, the fitting body further including a third arm defining a third passage, the third arm aligned along the first axis and in fluid communication with the first and second passages, the leg plate cut-out and the cradle plate cut-outs are sized and shaped to receive one of the first, second, and third arms, and the fitting body is disposed on the leg plate such that the first arm is disposed in one of the cradle plate cut-outs, the third arm is disposed in the other of the cradle plate cut outs, and the second arm extends through the leg plate cut out. The fitting body is formed having a T-shape, the fitting body further including a third arm defining a third passage, the third arm aligned along the first axis and in fluid communication with the first and second passages, the leg plate cut-out and the cradle plate cut-outs are sized and shaped to receive one of the first, second, and third arms, and the fitting body is disposed on the leg plate such that first and third arms are disposed between the cradle plates and the first axis is parallel to the side edges of the leg plate, and the second arm extends through the leg plate cut out.

One advantage of the inventive fire sprinkler support bracket includes the separation of the bracket from the tee-shaped fitting body. By doing so, assembly of the fitting to the supply line and sprinkler head, as well as the installation of the fire protection system as a whole becomes far easier, because the fitting can be joined to the water supply line independently of mounting the bracket to the building structure, making both the joining of the fitting to the supply line and the mounting of the bracket easier. In addition, the cost to manufacture both of the separate components is less than the cost to manufacture the conventional device, in which the mounting features were molded into the fitting and required subsequent complex finish machining, resulting in an expensive component.

Another advantage of the inventive fire sprinkler support bracket is that the bracket is configured to permit mounting to different kinds of mounting structures, while correctly positioning the fire sprinkler head at the required distance from the building structural component.

In addition, the inventive fire sprinkler support bracket can stably support a fire sprinkler fitting in any of several alternative fitting orientations.

In addition, the inventive fire sprinkler support bracket is designed to have sufficient rigidity and strength to maintain the sprinkler head in the desired location under full water pressure load while distributing the resulting load exerted by the active sprinkler on the building structure. Distribution of the resulting load prevents damage to the building structure while in use.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION

A description of a fire sprinkler fitting support bracket will now be provided with reference to the figures. In the following description, references to orientation such as "upward", "above", "downward", or "below" are made to describe the orientation shown in the figures, and are not intended to be absolute.

Figure 3:
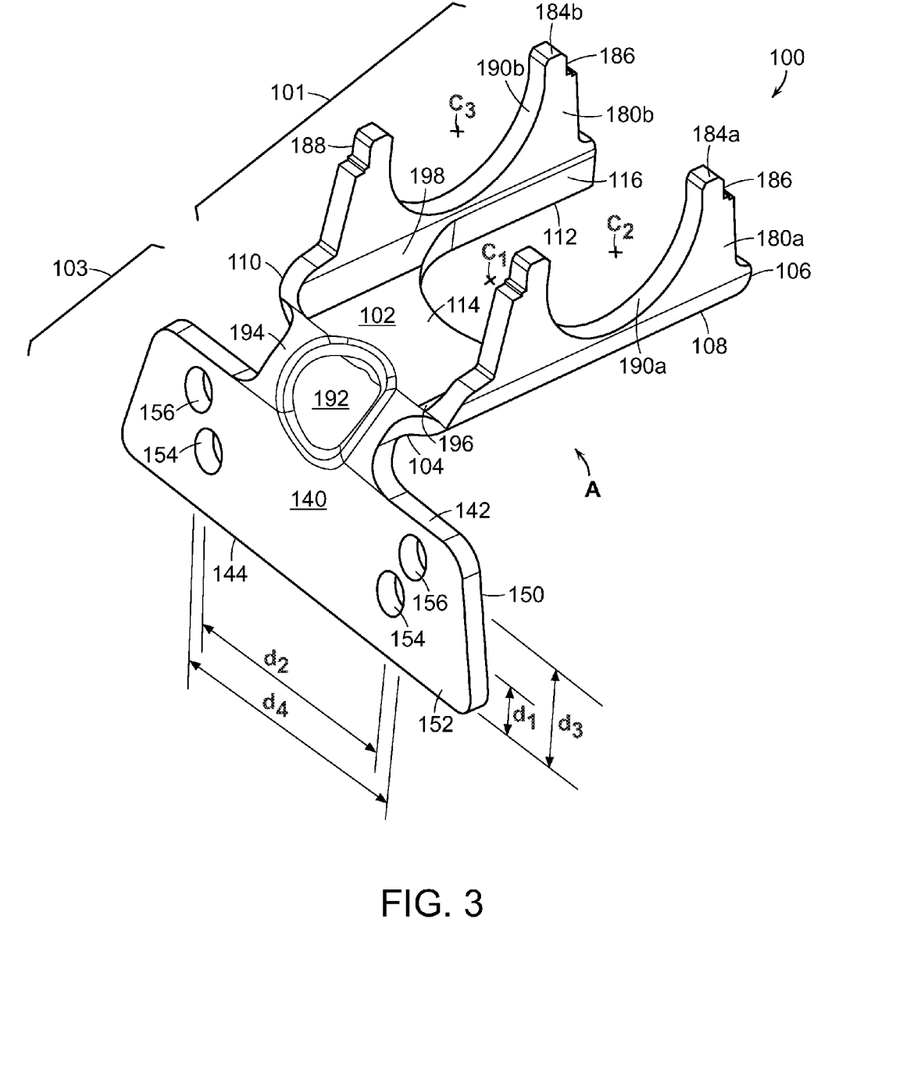
FIG. 3 is a perspective view of a fire sprinkler fitting support bracket.
Figure 4:
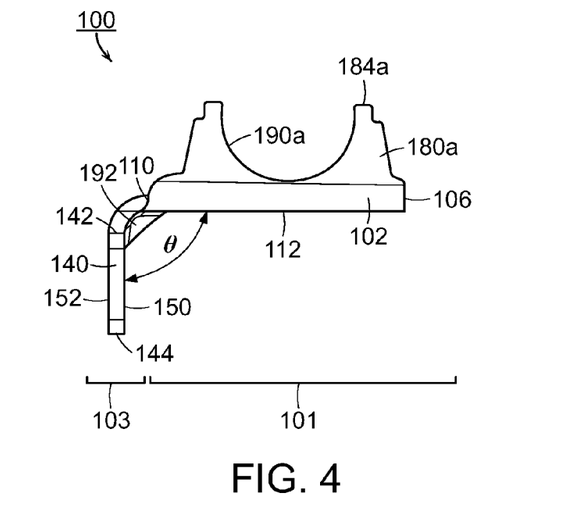
FIG. 4 is a side view of the fire sprinkler support bracket of FIG. 3 as seen in the direction of arrow A of FIG. 3.
Figure 9:
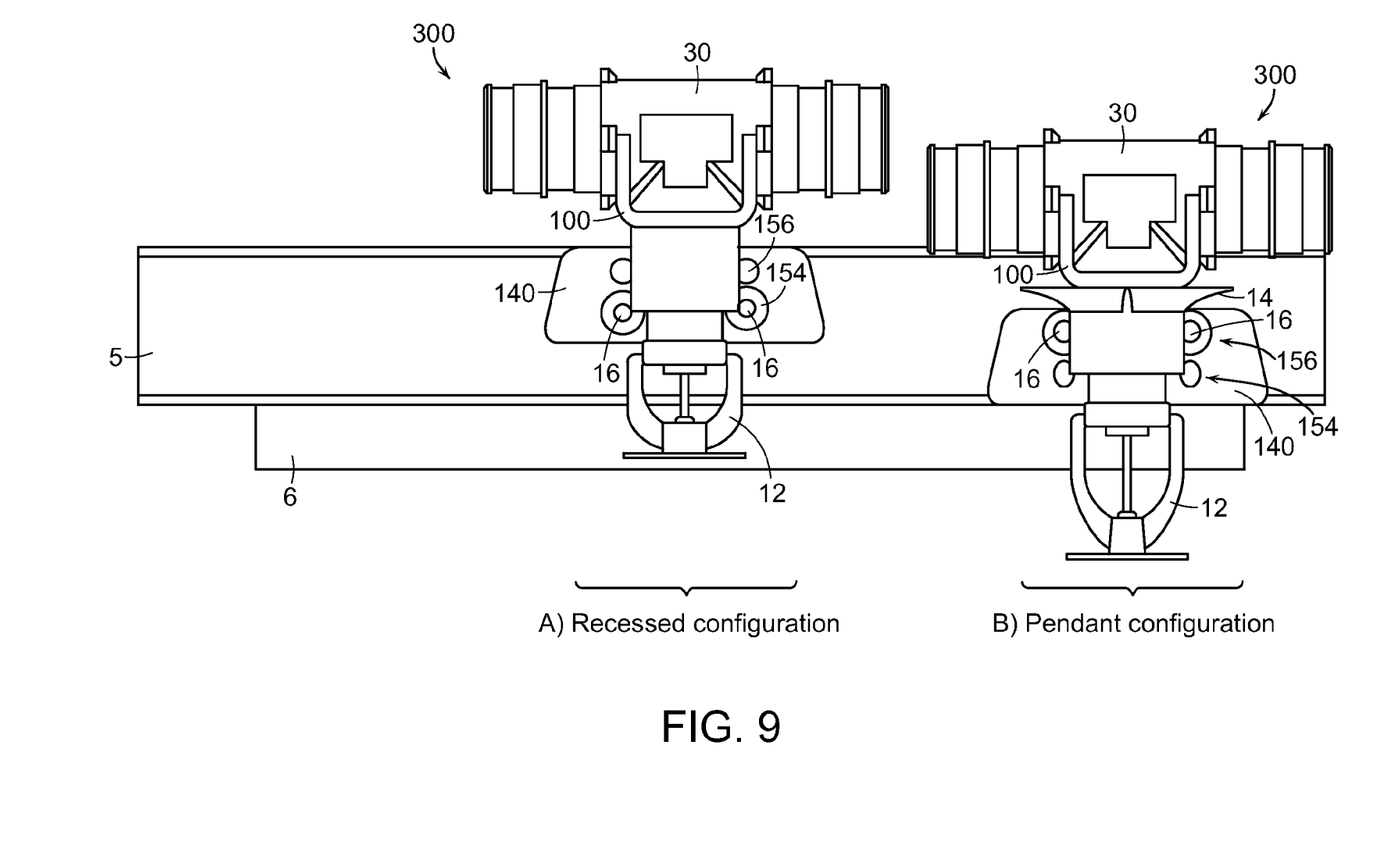
FIG. 9 is a front view of two mounting configurations of the bracket of FIG. 3

Referring now to FIGS. 3, 4 and 9, a fire sprinkler fitting support bracket 100 is shown in an orientation of use. The bracket 100 includes a cradle portion 101 for receiving and supporting a fire sprinkler fitting such as a tee fire sprinkler fitting 30 (described below), and a mounting portion 103 for mounting the bracket 100 to a building component 5 such as a beam, joist, stud or truss. In use, the mounting portion 103 is fixed to a substantially vertical surface of the building component 5.

As seen in FIGS. 3 and 4, the cradle portion 101 includes a leg plate 102 that extends generally horizontally when the bracket 100 is in use. The leg plate 102 has a base edge 104, and a free edge 106 that is opposed to the base edge 104. In addition, a first side edge 108 and a second side edge 110 extend between the base edge 104 and the free edge 106. The leg plate is substantially rectangular so that the first and second side edges 108, 110 are substantially parallel to each other. The leg plate 102 also includes a downward facing first surface 112, and an upward facing second surface 114. The leg plate 102 is provided with a concave cut-out 116 that opens along the free edge 106. The cut out 116 is generally U-shaped, and includes a substantially semi-circular portion having a center C1.

The cradle portion 101 further includes a pair of cradle plates 180a, 180b extending upward from the second surface 114 of the leg plate 102. Specifically, a first cradle plate 180a extends along the first side edge 108, and a second cradle plate 180b extends along the second side edge 110. Each cradle plate 180a, 180b is provided with a concave cut out 190a, 190b that opens upward, along an edge 184a, 184b that is opposed to the second surface 114 of the leg plate 102. The cradle plate cut outs 190a, 190b are generally U-shaped, and each cut out 190a, 190b has a substantially semi-circular portion. That is, the cut out 190a of the first cradle plate 180a has a center C2, and the cut out 190b of the second cradle plate 180b has a center C3.

The semi-circular portion of the leg plate 102, and the respective semi-circular portions of the pair of cradle plates 180a, 180b each have the same radius of curvature r, and are shaped and dimensioned to correspond to the peripheral shape and size of the fitting 30, as described below.

The mounting portion 103 of the bracket 100 includes a foot plate 140 that extends generally vertically when the bracket 100 is in use. The foot plate 140 has a fold edge 142 that is rigidly fixed to the base edge 104 of the leg plate 102 so that the first surface 112 of the leg plate 102 and a first surface 150 of the foot plate 140 define an angle θ therebetween. In the illustrated embodiment, the angle θ between the first surface 150 of the foot plate 140 and the first surface 112 of the leg plate 102 is about 90 degrees. The foot plate also includes a second surface 152 that is opposed to the first surface.

The foot plate 140 further includes a free edge 144 that is opposed to the fold edge 142, and the free and fold edges 144, 142 are substantially parallel. The fold edge 142 is shorter in length than the free edge 144 so that the foot plate 140 is generally trapezoidal in peripheral shape. In some embodiments, the free edge 144 of the foot plate 140 has a length of about 2.9 inches, and is spaced apart from the fold edge 142 a distance of about 0.9 inches. However, these dimensions are provided to give a general idea of the scale of this component, and the foot plate 140 is not limited to these dimensions.

The foot plate 140 is provided with two pair of through holes 154, 154 and 156, 156 which receive fasteners such as screws 16 (shown in FIG. 9) to secure the foot plate to a building component 5. In use, one pair of through holes (for example through hole pair 154, 154) is selected to receive the fasteners, and the remaining pair (in this example, through hole pair 156, 156) is not used. The selection of through-hole pair is determined by the sprinkler fitting mounting configuration used, as discussed further below with reference to FIG. 8.

The first pair of through holes 154, 154 is disposed on the foot plate 140 so that each hole 154 of the first pair is located a first distance d1 from the free edge 144 of the foot plate 140, and the holes 154 of first pair of through holes 154, 154 are spaced apart by a second distance d2. The second pair of through holes 156, 156 is disposed on the foot plate 140 so that each hole 156 of the second pair is located a third distance d3 from the free edge 144 of the foot plate 140, and holes 156 of the second pair of through holes 156, 156 are spaced apart by a fourth distance d4.

Specifically, the first pair of through holes 154, 154 are disposed closer to the free edge 144 of the foot plate 140 than the second pair of through holes 156, 156 (e.g., d1<d3), and the first pair of through holes 154, 154 are closer together than the second pair of through holes 156, 156 (e.g., d2<d4).

Each through hole 154, 154, 156, 156 may be slightly elongated in a direction transverse to the free edge 144. This elongation permits adjustment of the alignment of the bracket 100 relative to a building structure when the bracket 100 is mounted thereto.

In addition, the distance of the center C1 of the leg plate cut-out 116 from the first surface 150 of the foot plate 140 is the same as the distance of the centers C2, C3 of each of the cradle plate cut-outs 190a, 190b from the first surface 150 of the foot plate 140.

Figure 5:
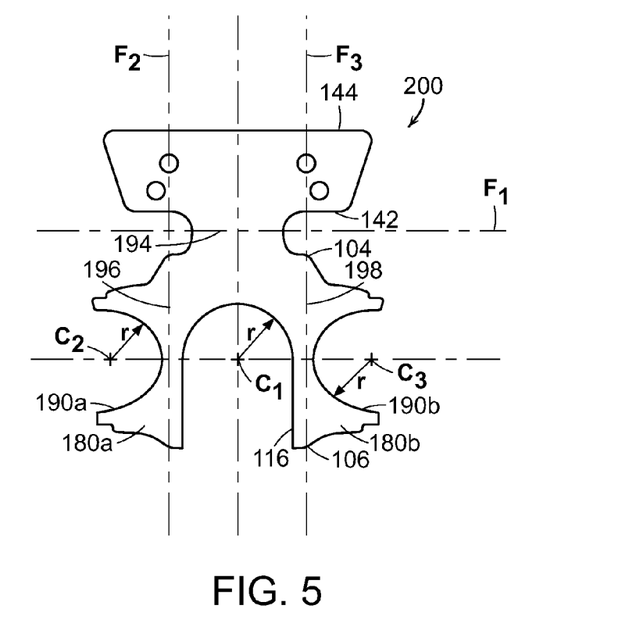
FIG. 5 is a plan view of a blank for the fire sprinkler fitting support bracket of FIG. 3.

Referring now to FIG. 5, the bracket 100 is formed of a single, rolled plate of 1050 annealed spring steel. In the illustrated embodiment, the spring steel is provided in a thickness of about 0.134" (10 Ga.). However, this dimension is provided to give a general idea of the scale of this component, and the thickness of the plate not limited to this dimension. A blank 200 is formed by a stamping process to obtain the desired peripheral shape. The final configuration that is shown in FIG. 3 is achieved by performing the following three bending operations on the blank 200:

a. A first bend portion 194 is provided along a linear fold line F1 at a location corresponding generally to the base edge 104 of the leg plate 102. The first bend portion 194 joins the leg plate 102 to the foot plate 140. In addition, the first bend portion 194 is provided with a gusset 192 which serves to add rigidity to the first bend portion 194 and the bracket 100 as a whole.

b. A second bend portion 196 is provided along a linear fold line F2 at a location corresponding to the first side edge 108 of the of the leg plate 102. The second bend portion joins the first cradle plate 180a to the leg plate 102.

c. A third bend portion 198 is provided along a linear fold line F3 at a location corresponding to the second side edge 110 of the leg plate 102. The third bend portion joins the second cradle plate 180b to the leg plate 102.

The first, second and third bend portions 194, 196, 198 are of approximately 90 degrees, and the bend direction of the first bend portion 194 is opposed to that of the second and third bend portions 196, 198.

Figure 6:
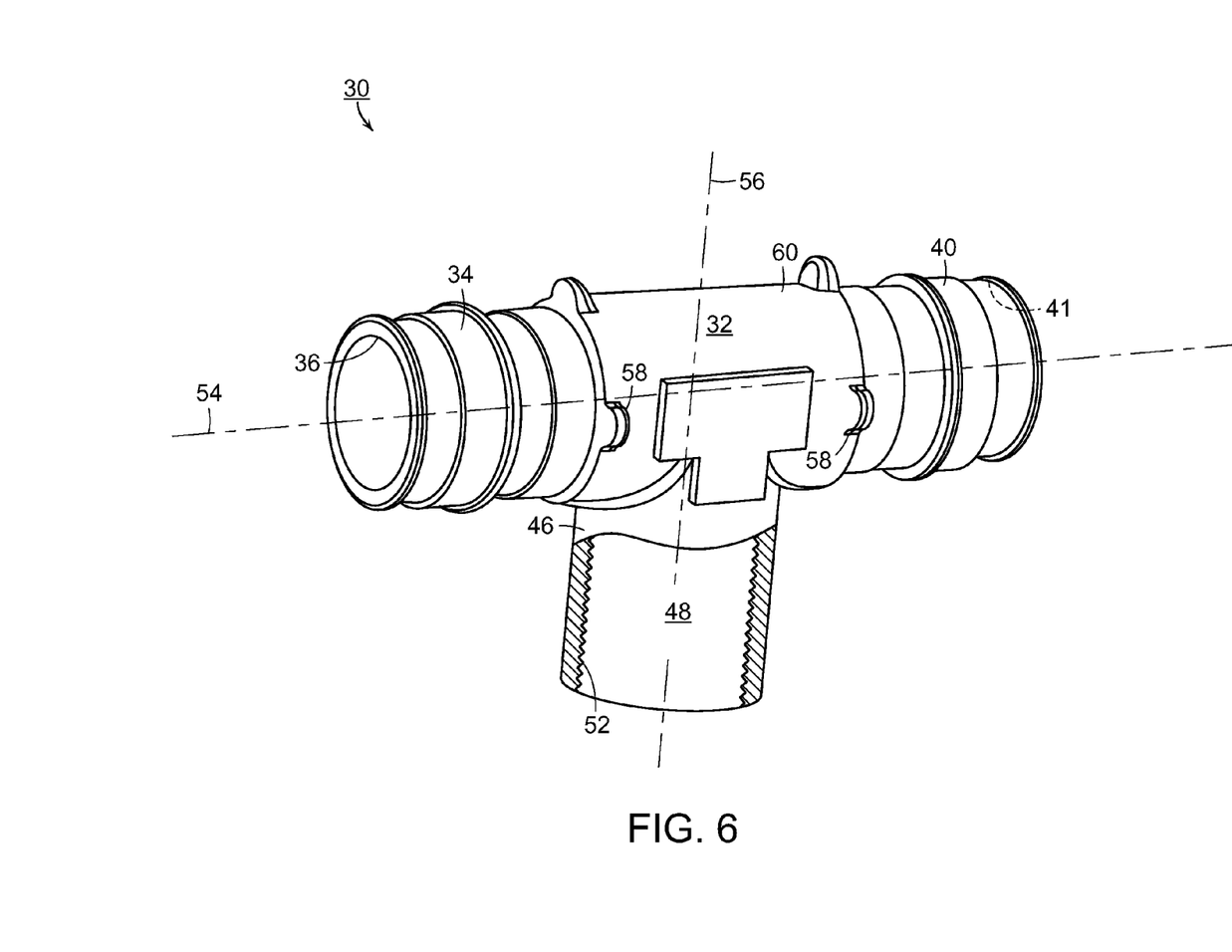
FIG. 6 is a perspective view of a fire sprinkler tee fitting.

The bracket 100 is used to support a sprinkler head tee fitting 30. As seen in FIG. 6, the fitting 30 is a hollow, T-shaped body 32 having a first arm 34 defining a first passage 36 therein, a second arm 40 defining a second passage 42 therein, and a third arm 46 defining a third passage 48 therein. The first and second arms 34, 40 are generally cylindrical and form the bar of the T such that the first and second passages 36, 42 are aligned along a common first axis 54, and are in fluid communication with each other. The third arm 46 arm is also generally cylindrical and is aligned along a second axis 56 that is perpendicular to the first axis 54, whereby the third arm 46 provides the leg of the T. The third passage 48 intersects the first and second passages 36, 42 and is in fluid communication with the first and second passages 36, 42.

The outer peripheral surfaces of the first and second arms 34, 40 are contoured to facilitate connection to the water supply line 3. Tabs 58 are provided on the outer peripheral surface 60 of the fitting body 32 that extend in a radially outward direction from the surface 60. The tabs 58 are spaced apart along a circumference of the body 32 at a location where each of the first and second arms 34, 40 extend from the body 32. In addition, the third arm 46 is provided with a threaded portion 52 on an interior surface thereof. The threads 52 are configured to cooperatively engage counterpart threads formed on an outer surface of a sprinkler head.

Figure 7:
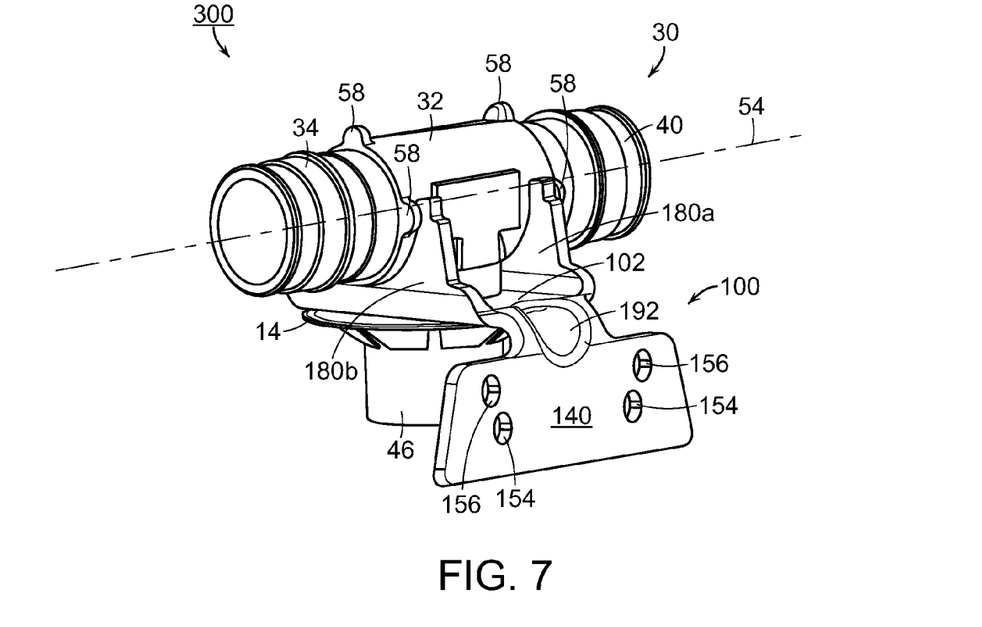
FIG. 7 is a rear perspective view of the fitting of FIG. 6 assembled with the bracket of FIG. 3.
Figure 8:
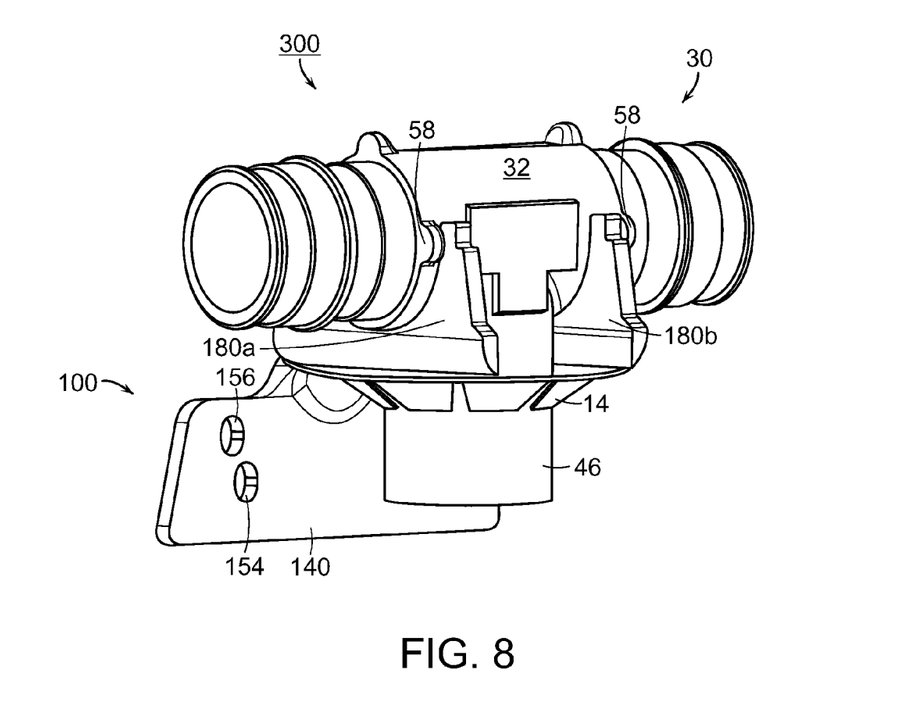
FIG. 8 is a front perspective view of the assembly of FIG. 7.

Referring now to FIGS. 7 and 8, an assembly 300 of the tee fitting 30 mounted on the bracket 100 will now be described. As previously discussed, in use, the bracket 100 is oriented such that the leg plate 102 extends generally horizontally, and such that the cradle plate cut-outs 190a, 190b open upward. When assembled, the tee fitting 30 rests on the upper side of the leg plate 102 so that the first and second arms 34, 40 of the tee fitting 30 are each received in a respective cut-out 190a or 190b of the cradle arms 180a, 180b, and the first axis 54 of the fitting 30 passes approximately through the centers C2, C3 of each of the cradle plate cut-outs 190a, 190b. The cradle arms 180a, 180b are of sufficient height to engage the tabs 58 formed on the outer surface 60 of the tee fitting 30. At the same time, the third arm 46 of the tee fitting 30 extends downward through the leg plate cut-out 116.

The open, concave shape of the cut-outs 116, 190a, 190b make it very easy to drop the tee fitting 30 into place, even when arms 34, 40, 48 of the fitting 30 have been pre-connected to the supply line 3 and the sprinkler head 12. In addition, the concave configuration and upward-opening orientation of the cradle plate cut outs 190a, 190b position and retain the first and second arms 34, 40 of the tee fitting 30, while the concave configuration and laterally-opening leg plate cut out 116 positions and retains the third arm of the tee fitting 30.

In addition, since the tee fitting 30 is formed separately from the bracket 100, an installer of the fire protection system has an increased number of options for installing the system in a building. For example, the installer has the option of mounting the bracket 100 to a building component 5 at a desired location, and then customizing placement of the tee fitting 30 within the supply line 3 to accommodate the location of the bracket 10. Alternatively, the installer can assemble the tee fittings 30 within the supply line 3, and then mount brackets 100 to the building component 5 at locations which correspond to the position of the tee fittings 30 along the supply line 3.

In some embodiments, a speed nut 14 is provided on the third arm 46 of the tee fitting 30 so that the leg plate 102 is disposed between the speed nut 14 and the first and second arms 34, 40 of the tee fitting 30. The speed nut 14 is made from spring steel and has a serrated inner diameter that is sized to be press fit about the outer periphery of the third arm 46. The speed nut 14 serves to retain the tee fitting 30 on the cradle portion 101, even when a sprinkler head 12 (not shown in FIGS. 7 and 8) attached to the third arm 46 is actively spraying water.

As seen in FIGS. 7 and 8, the cradle portion 101 is cantilevered from an upper edge of the foot plate 140. In use, when the foot plate 140 is secured to a building component 5, the tee fitting 30 is disposed on the cradle portion 101 and a sprinkler head 12 attached thereto is actively spraying water, the cradle portion 101 will be subjected to loads of up to 250 lbs, whereby a very large bending moment is applied to the bracket 100. The trapezoidal shape of the foot plate 140, as well as the dimensions thereof, permit the foot plate 140 to distribute the applied bending moment over a sufficient area of the building component 5 so that the building component 5 is not damaged (for example, indented or fractured) due to the applied load.

Referring now to FIG. 9, two possible mounting configurations of the assembly 300 to a building component 5 are shown. In the embodiments shown in FIG. 9, the building component 5 is a conventional ceiling joist. For example, the building component 5 may be a 2×4 wood beam, and may support a finish material layer 6 such as sheet rock along a lower surface thereof.

To achieve a concealed installation of the sprinkler head 12, in which the assembly 300 is mounted to the joist 5 so that the sprinkler head 12 is recessed above a lower surface of the sheet rock 6 (see configuration A), the second surface 152 of the foot plate 140 is positioned abutting a vertical surface of the joist 5, and the fold edge 142 of the foot plate 140 is aligned with an upper edge of the joist 5. In addition, the foot plate 140 is fastened to the joist 5 using screws 16 inserted through the first pair of through holes 154, 154.

To achieve an exposed installation, in which the assembly 300 is mounted to the joist 5 so that the sprinkler head 12 is pendant below a lower surface of the sheet rock 6 (see configuration B), the second surface 152 of the foot plate 140 is positioned abutting a vertical surface of the joist 5, and the free edge 144 of the foot plate 140 is aligned with an lower edge of the joist 5. In addition, the foot plate 140 is fastened to the joist 5 using screws 16 inserted through the second pair of through holes 156, 156.

Advantageously, the foot plate 140 is dimensioned so that regardless of which of the two mounting configurations is selected, the sprinkler head 12 is easily and accurately positioned relative to the ceiling 5, 6 at the required location.

In addition, by providing the foot plate 140 with through hole pairs 154, 156 located at different distances d1, d3 relative to the free edge 144, it is possible to position the screws 16 at a sufficient distance from the upper and lower edges of the joist 5 so that the joist 5 is prevented from splitting when the bracket 100 is under load during active use of the sprinkler head 12.

Figure 10:
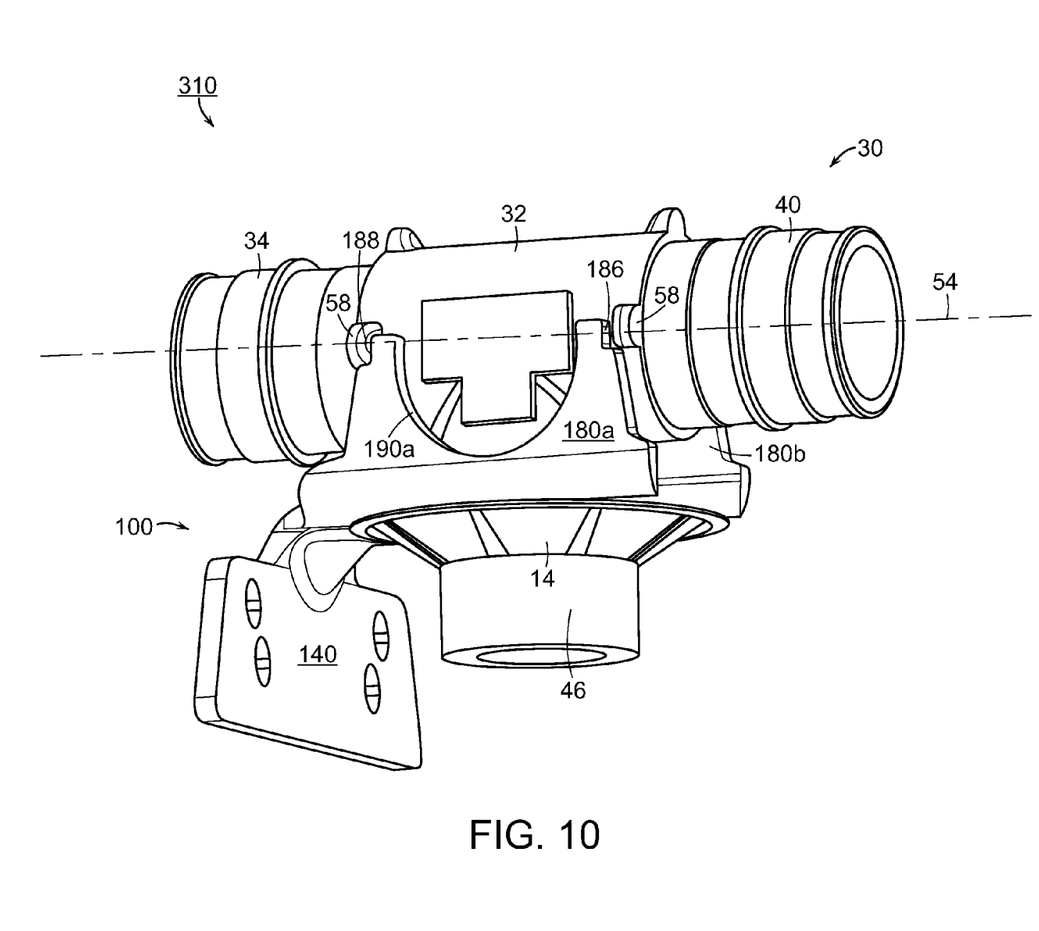
FIG. 10 is a front perspective view of the fitting of FIG. 6 in an alternative assembly with the bracket of FIG. 3.

Referring now to FIG. 10, an alternative assembly 310 of the tee fitting 30 mounted on the bracket 100 will now be described. As in the assembly 300, the bracket 100 is oriented such that the leg plate 102 extends generally horizontally, and such that the cradle plate cut-outs 190a, 190b open upward. In the alternative assembly 310, the tee fitting 30 rests on the upper side of the leg plate 102 so that the first and second arms 34, 40 of the tee fitting 30 extend between the cradle arms 180a, 180b and the first axis 54 of the tee fitting 30 is generally parallel to the first and second side edges 108, 110 of the leg plate 102. The tabs 58 formed on the outer surface 60 of the fitting 30 are received in notches 186, 188 formed in cradle arms 180a, 180b. The notches 186, 188 are provided in the free edge 184a, 184b of the cradle arms 180a, 180b on opposed sides of the respective cut out 190a, 190b. At the same time, the third arm 46 of the tee fitting 30 extends downward through the leg plate cut-out 116.

Figure 11:
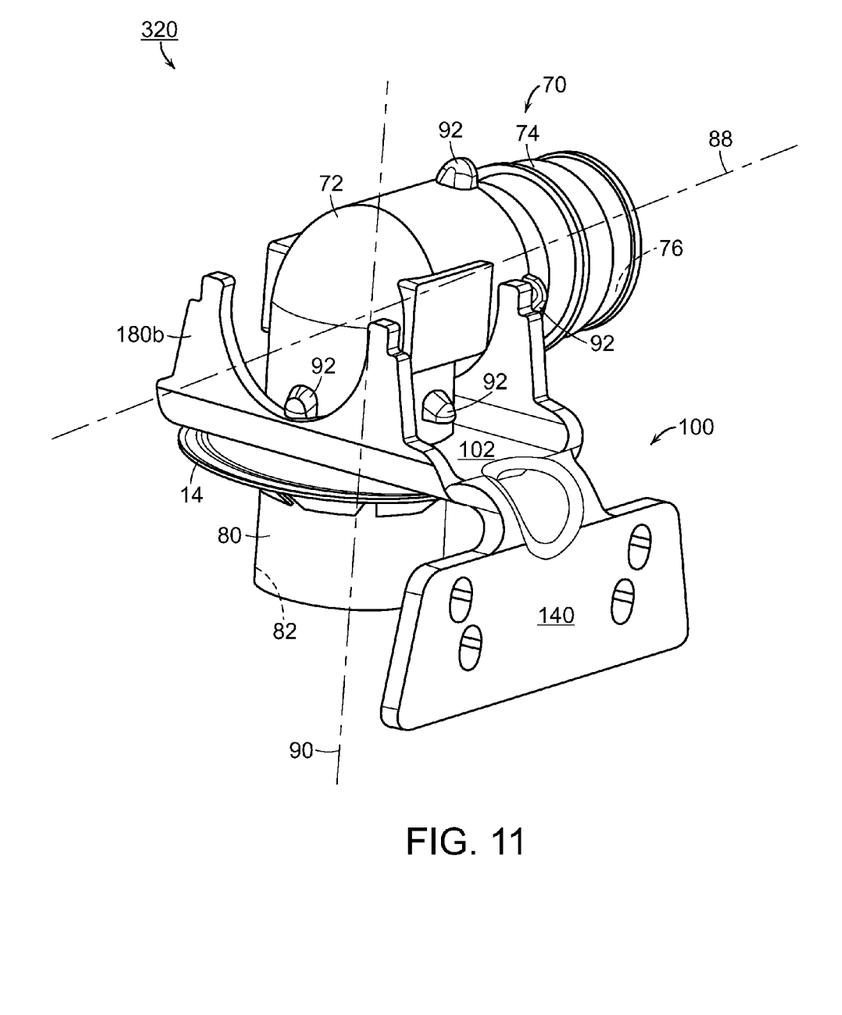
FIG. 11 is a rear perspective view of a fire sprinkler elbow fitting assembled with the bracket of FIG. 3.

Although the fire sprinkler support bracket 100 has been described herein as supporting a tee fitting 30, the bracket 100 is not limited to supporting fittings having a tee shape. For example, as seen in FIG. 11, the bracket 100 can be used to support an elbow fitting 70. The elbow fitting 70 is a hollow, L-shaped body 72 having a first arm 74 defining a first passage 76 therein, and a second arm 80 defining a second passage 82 therein. The first and second arms 74, 80 are generally cylindrical. The first arm 74 is aligned along a first axis 88, the second arm 80 is aligned along a second axis 90 that is perpendicular to the first axis 88. As a result, the first and second passages 76, 82 intersect, and are in fluid communication with each other.

The outer peripheral surfaces of the first and second arms 74, 80 are contoured to facilitate connection to the water supply line 3. Tabs 92 are provided on the outer peripheral surface 94 of the elbow fitting body 72 that extend in a radially outward direction from the surface 94. The tabs 92 are spaced apart along a circumference of the body 72 at a location where each of the first and second arms 74, 80 extend from the body 72. In addition, the second arm 82 is provided with a threaded portion (not shown) on an interior surface thereof which is configured to cooperatively engage counterpart threads formed on an outer surface of a sprinkler head.

When the elbow fitting 70 is supported on bracket 100 to form an assembly 320, the elbow fitting 70 rests on the upper side of the leg plate 102 so that the first arm 74 of the elbow fitting 70 is received in the cut-out (for example, 190a) of one of the cradle arms (in this example, 180a). The first axis 88 of the elbow fitting 70 passes approximately through the center C2 of the cut-out 190a, and the tabs 92 formed on the first arm 74 engage the cradle arm 180a. At the same time, the second arm 80 of the elbow fitting 70 extends downward through the leg plate cut-out 116 such that the second axis 90 of the elbow fitting 70 passes approximately through the center C1 of the cut-out 116. A tab 92 formed on the second arm 80 rests on the cut-out 190b of the other cradle arm 180b. A speed nut 14 may be provided on the second arm 80 so that the leg plate 102 is disposed between the speed nut 14 and the first arm 74 of the elbow fitting 70.

Figure 12:
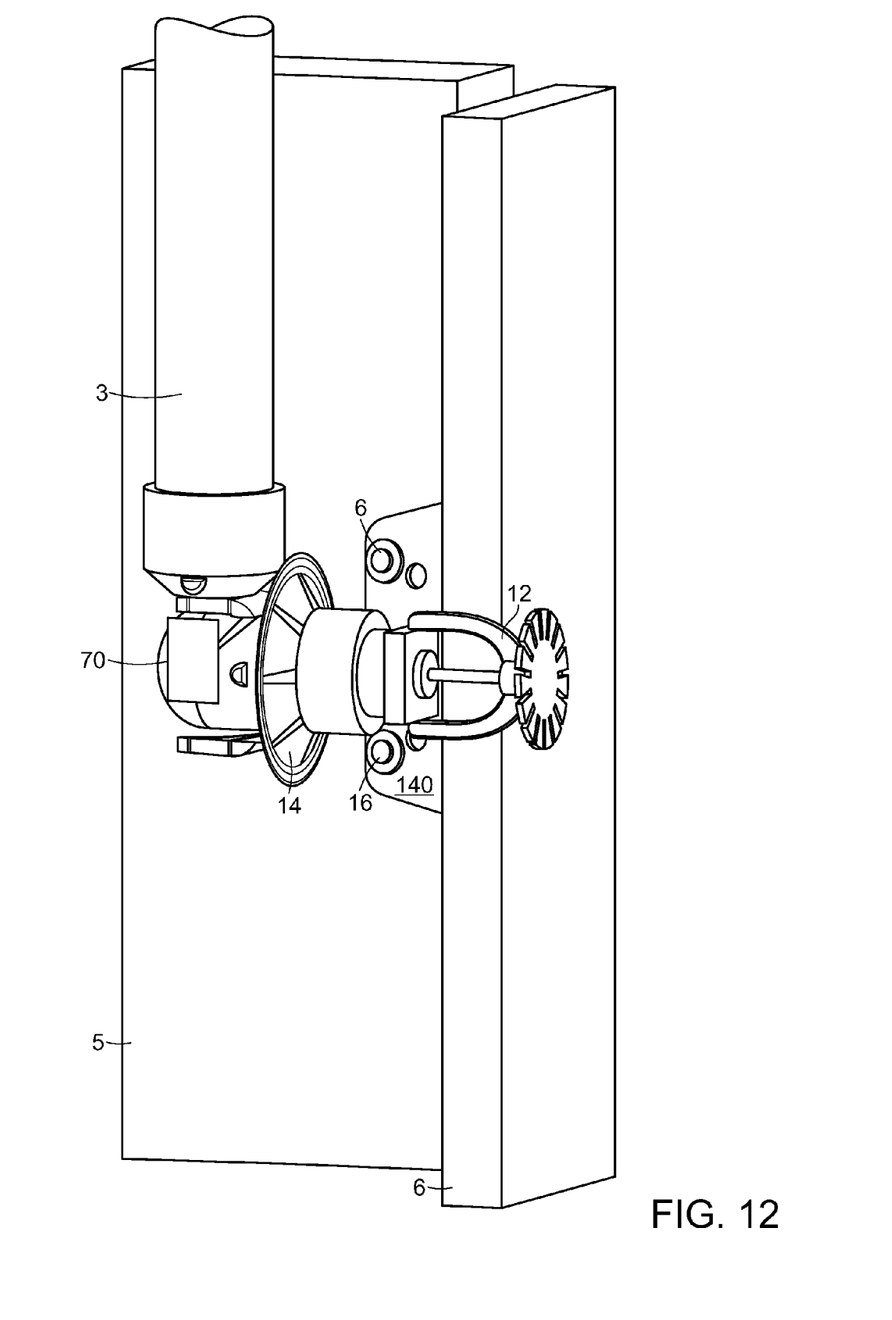
FIG. 12 is a front perspective view of another mounting configuration of the bracket of FIG. 3.

In the embodiments illustrated in FIGS. 3 and 7-11, the bracket 100 is illustrated in an orientation in which the foot plate 140 extends generally vertically, and the leg plate 102 extends generally horizontally with the cradle plate cut-outs 190a, 190b opening upward. However, the bracket 100 is not limited to being used in this orientation. In the embodiment shown in FIG. 12, the building component 5 is a conventional wall stud. For example, the building component 5 may be a 2×4 wood beam, and may support a finish material layer 6 such as sheet rock along a side surface thereof. In this embodiment, the bracket 100 is oriented such that both the foot plate 140 and the leg plate 102 extend generally vertically, and the cradle plate cut-outs 190a, 190 open in a direction away from the sheet rock 6. Specifically, the second surface 152 of the foot plate 140 is positioned abutting a vertical surface of the stud 5, and the free edge 144 of the foot plate 140 is aligned with side edge of the stud 5 adjacent to the sheet rock 6. In addition, the foot plate 140 is fastened to the stud 5 using screws 16 inserted through the second pair of through holes 156, 156.

In the illustrated embodiments, the foot plate 140 is formed having two pair of through holes 154, 154 and 156, 156 as discussed above. In other embodiments, the foot plate 140 may include a single pair of elongated slots (not shown), the slot being elongated in a direction transverse to the fold edge 142 and free edge 144 of the foot plate 140, and having a length sufficient to permit fastener placement away from the upper and lower edges of the joist 5 regardless of mounting configuration selected.

A selected illustrative embodiment of the invention is described above in some detail. It should be understood that only structures considered necessary for clarifying the present invention have been described herein. Other conventional structures, and those of ancillary and auxiliary components of the system, are assumed to be known and understood by those skilled in the art. Moreover, while a working example of the present invention has been described above, the present invention is not limited to the working example described above, but various design alterations may be carried out without departing from the present invention as set forth in the claims.

What is claimed is:

1. A fire sprinkler fitting support bracket, the bracket comprising:
a leg plate including
a base edge;
a free edge opposite the base edge;
a first side edge extending between the base edge and the free edge,
a second side edge extending between the base edge and the free edge and opposite the first side edge;
a foot plate, a fold edge of the foot plate fixed to the base edge so that a first surface of the leg plate and a second surface of the foot plate define an angle therebetween,
a first cradle plate extending from a third surface of the leg plate and along the first side edge of the leg plate, the third surface being opposite the first surface,
a second cradle plate extending from the third surface of the leg plate and along the second side edge of the leg plate;
wherein
the leg plate is formed having a first concave cut-out that opens along the free edge,
the first cradle plate is formed having a second concave cut out that opens along an edge thereof that is opposite the third surface of the leg plate, and
the second cradle plate is formed having a third concave cut out that opens along an edge thereof that is opposite the third surface of the leg plate.

2. The fire sprinkler fitting support bracket of claim 1, wherein the foot plate has a trapezoidal peripheral shape.

3. The fire sprinkler fitting support bracket of claim 1, wherein
the foot plate includes a free edge opposite the fold edge,
the free edge of the footplate and the fold edge of the foot plate are parallel, and
the free edge of the footplate is longer than the fold edge of the footplate.

4. The fire sprinkler fitting support bracket of claim 3 where the foot plate includes a first pair of through holes, each hole of the first pair of through holes located a first distance from the free edge of the footplate.

5. The fire sprinkler fitting support bracket of claim 4 wherein the foot plate includes a second pair of through holes, each hole of the second pair of through holes located a second distance from the free edge of the footplate, wherein the second distance is greater than the first distance.

6. The fire sprinkler fitting support bracket of claim 1, wherein the leg plate, the foot plate, and the pair of cradle plates are formed of a single plate member that includes
a first bend portion disposed at a location corresponding to the base edge, the first bend joining the leg plate to the foot plate,
a second bend portion disposed at a location corresponding to the first side edge of the of the leg plate, the second bend joining the first cradle plate to the leg plate, and
a third bend portion disposed at a location corresponding to the second side edge of the leg plate, the third bend joining the second cradle plate to the leg plate.

7. The fire sprinkler fitting support bracket of claim 6, wherein the first, second and third bend portions are of approximately 90 degrees, and the bend direction of the first bend portion is opposite that of the second and third bend portions.

8. The fire sprinkler fitting support bracket of claim 6, wherein the first bend portion includes a gusset.

9. The fire sprinkler fitting support bracket of claim 1 wherein
the leg plate cut-out includes a substantially semi-circular portion having a center,
each cradle plate cut-out includes a substantially semi-circular portion having a respective center, and
the distance in a direction along the first side edge of the center of the leg plate cut-out from the second surface of the foot plate, and the distance in a direction along the first side edge of the center of each of the cradle plate cut-outs from the second surface of the foot plate, are the same.

* * * * *